(12) United States Patent
Chu et al.

(10) Patent No.: US 6,974,242 B1
(45) Date of Patent: Dec. 13, 2005

(54) ENGAGING STRUCTURE OF BACKLIGHT MODULE

(75) Inventors: Kuo-Liang Chu, Ping Chen (TW); Chia-Rung Fan, Taoyuan (TW)

(73) Assignee: Chunghwa Picture Tubes, Ltd., (TW)

( * ) Notice: Subject to any disclaimer, the term of this patent is extended or adjusted under 35 U.S.C. 154(b) by 0 days.

(21) Appl. No.: 10/914,239

(22) Filed: Aug. 10, 2004

(51) Int. Cl.[7] .............................................. F21V 33/00
(52) U.S. Cl. ...................................... 362/633; 362/634
(58) Field of Search ........................... 362/26, 31, 362, 362/561, 632, 633, 634; 349/58, 67

(56) References Cited

U.S. PATENT DOCUMENTS

| | | | | |
|---|---|---|---|---|
| 5,442,470 A | * | 8/1995 | Hashimoto | .................... 349/58 |
| 6,392,723 B1 | * | 5/2002 | Sugiyama et al. | ............ 349/58 |
| 2003/0223020 A1 | * | 12/2003 | Lee | .............................. 349/58 |

* cited by examiner

Primary Examiner—Y. My Quach-Lee

(57) ABSTRACT

An engaging structure of a backlight module is disclosed. The engaging structure utilizes protruding portions, which extend from the bottom edge of a side wall of a mold frame, insert into corresponding holes on a chassis, and so fasten and position the mold frame on the chassis. The engaging structure prevents that the problems of light leak are caused by the backlight module and scratches on a driving IC on a side of a backlight.

11 Claims, 4 Drawing Sheets

ENGAGING STRUCTURE OF BACKLIGHT MODULE

FIELD OF THE INVENTION

The present invention relates to an engaging structure of a backlight module, and more particularly, to an engaging structure that is adapted for fastening and positioning a mold frame on a chassis.

BACKGROUND OF THE INVENTION

Processes of fabricating a liquid crystal display (LCD) screen mainly include a process of a thin film transistor array substrate, a process of a color filter layer, an assembling process of a liquid crystal (LC) cell, an assembling process of a LC module (LCM), and so on. Among the foregoing processes, the assembling process of the LCM is a process in which a metal frame, a LCD panel, and a backlight module are assembled, and after assembling the LCM, the LCD screen is completely manufactured. More specifically, in the assembling process of the LCM, the LC cell is overlaid on the backlight module, through interlocking of the metal frame and a mold frame of the backlight module, folding a printed circuit board (PCB) to a backside of the mold frame, and then electrically connected to the PCB, so as to finish the assembling processes of the LCD panel and the backlight module.

In regard to the LCD panel of the LCD, it is not a self-luminescent display element, and thus requires a light source provided by the backlight module. In other words, the backlight module provides the required brightness, uniformity of brightness, and the visual angle (the aligning angle of the emitting light) for displaying pictures. With regard to mechanical properties, the backlight module must be thin, light, and tolerant to shock. The properties of the backlight module directly influence the quality of the LCD, and thus, the backlight module is a very important component.

The backlight module typically comprises a diffuser, a light guide plate, a plurality of backlight sources, and a chassis. The light guide plate is used for guiding light in a planar surface to ensure uniform brightness of the LCD panel. The backlight sources must be highly bright, long-lasting, and so on, and the backlight sources are mainly cold cathode fluorescent lamps (CCFL). When the backlight module is thinner, the shapes of the backlight sources more easily cause irregularity and shadows on the LCD screen because the backlight sources are arranged directly under the light guide plate. The common solution is to install a diffuser or adjust the shape of the diffuser to scatter the light passing through the light guide plate, thus eliminating the shadows of the backlight sources and making the brightness of the screen more uniform. As for the chassis, it is used as a reflector, and can prevent the light emitting by the backlight sources from leaking out, and increase the utility efficiency of light.

However, many problems exist in the assembling process of the LCM in the prior art. For example, reference is made to FIG. 1, which illustrates a schematic diagram showing the engaging structure of the backlight module in the prior art. The engaging structure 100 of the backlight module in the prior art comprises the chassis 101 and the mold frame 111. The chassis 101 may be made of aluminum and comprises a bottom plate 103 and a first side wall 105 disposed on the bottom plate 103 and surrounding the edge thereof for defining a space 107. The mold frame 111, which can be integrally formed from plastic with mold and be mounted in the space 107 of the chassis 101, comprises a frame margin 113 and a second side wall 115 disposed beneath the frame margin 113 and surrounding an outer edge thereof.

Reference is made to FIG. 2, which illustrates a cross-section of part of the backlight module in the prior art. Because the mold frame 111 on a side of the backlight sources 121 has no positioning structure, the mold frame 111 may shift and even generate a twisted displacement. For example, the mold frame 111 may shrink to a side of the LCD panel (not shown) and influence the LCD panel, the films 123 such as the diffuser and the light guide plate may warp, the backlight sources 121 may shift, and drawbacks such as a light leak of the backlight module or luminescent lines occurring on the LCD panel may even result. In addition, the driving integrated circuit (IC) 125 connects to the LCD panel (not shown) with a tape carrier package (TCP) technique. The chassis 101 is typically made of aluminum. During the assembling process, the uneven edge 102 of the chassis 101 may easily scrape the driving IC 125 on the side of the backlight sources 121.

SUMMARY OF THE INVENTION

One object of the present invention is to provide an engaging structure of the backlight module. The engaging structure utilizes at least one protruding portion, which extends from the bottom edge of a side wall of a mold frame and inserts into corresponding holes on a chassis, so as to fasten and position the mold frame on the chassis, and to improve the problems of light leak caused by the conventional backlight module and scratches on the driving IC on the side of the backlight sources.

According to the aforementioned aspect of the present invention, it provides an engaging structure of the backlight module, which comprises elements as follows. A chassis comprises a bottom plate and a first side wall disposed on the bottom plate and surrounding an edge thereof to define a space. At least one hole is located along a common edge of the first side wall and the bottom plate, and perforates the first side wall and the bottom plate. A mold frame is mounted in the space of the chassis, and the mold frame comprises a frame margin and a second side wall disposed beneath the frame margin and surrounding an outer edge thereof. A bottom edge of the second side wall has at least one protruding portion inserting into corresponding holes on the chassis, so as to fasten the mold frame into the space of the chassis.

The engaging structure of the backlight module can be employed to increase the fastening stability and positioning accuracy between the mold frame and the chassis, and to reduce the light leak caused by the backlight module and scratches on the driving IC on the side of the backlight sources in the prior art.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention discloses an engaging structure of the backlight module. The engaging structure utilizes at least one protruding portion, which extends from the bottom edge of a side wall of a mold frame, inserting into corresponding holes on a chassis, so as to fasten and position the mold frame on the chassis, and to reduce the light leak caused by the backlight module and scratches on the driving IC on the side of the backlight sources. In order to describe the engaging structure of the backlight module of the present invention more explicitly and completely, the following description is stated with reference to FIGS. 3 to 5.

Figure 1:
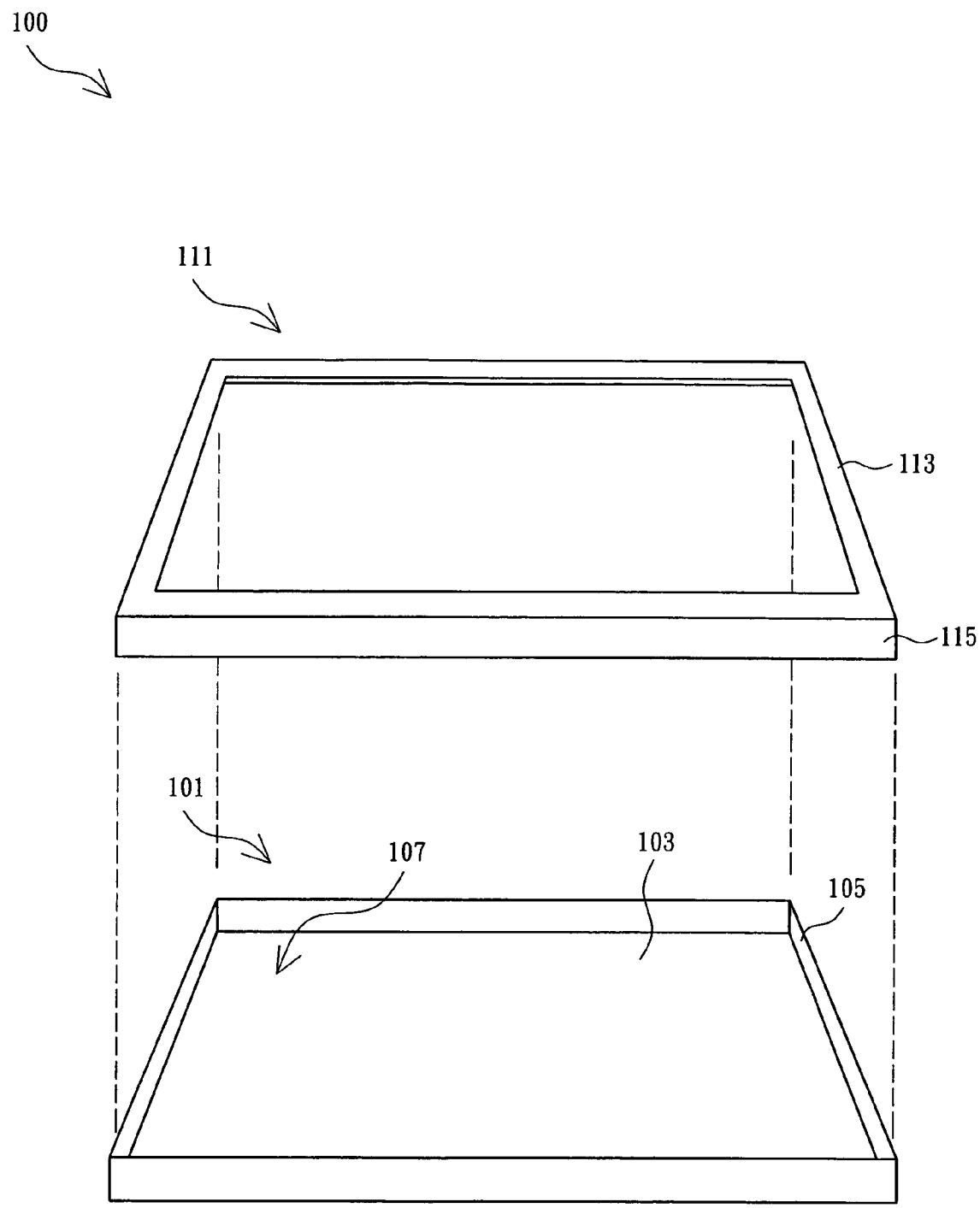
FIG. 1 is a schematic diagram showing the engaging structure of the backlight module in the prior art.
Figure 2:
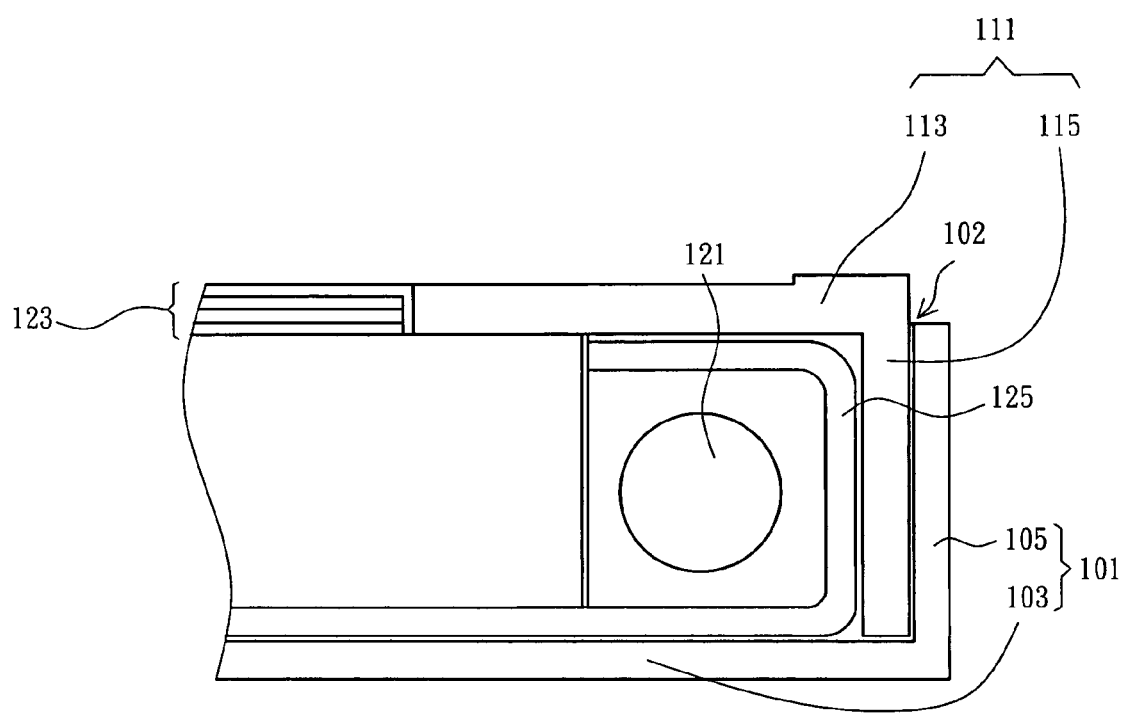
FIG. 2 is a schematic, cross-sectional diagram of part of the backlight module in the prior art.
Figure 3:
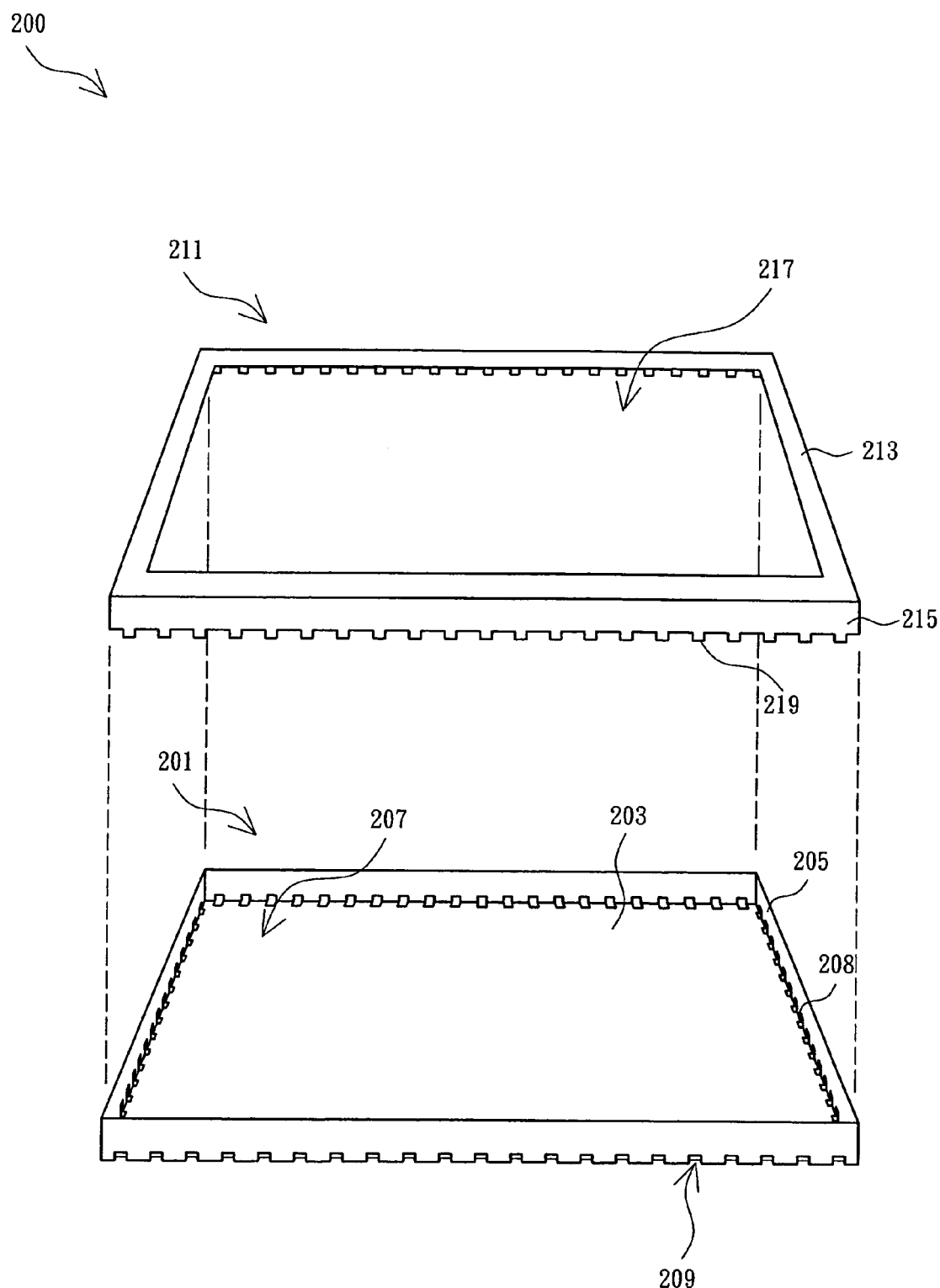
FIG. 3 is a schematic diagram of the engaging structure of the backlight module in accordance with a preferred embodiment of the present invention.

Reference is made to FIG. 3, which is a schematic diagram of the engaging structure of the backlight module in accordance with a preferred embodiment of the present invention. The engaging structure 200 of the backlight module comprises a chassis 201 and a mold frame 211. The chassis 201, which may be made of aluminum, comprises a bottom plate 203, a first side wall 205 disposed on the bottom plate 203 and surrounding an edge thereof to define a space 207, and at least one hole 209 located along a common edge 208 of the first side wall 205 and the bottom plate 203 and perforating the first side wall 205 and the bottom plate 203.

The mold frame 211, which may be formed from plastic with a mold, is mounted in the space 207 of the chassis 201, and the mold frame 211 that comprises a frame margin 213 and a second side wall 215 is disposed beneath the frame margin 213 and surrounding an outer edge thereof. A bottom edge of the second side wall 215 has at least one protruding portion 219 inserting into each corresponding hole 209 on the chassis 201, so as to fasten the mold frame 211 into the space 207 of the chassis 201.

According to a preferred embodiment of the present invention, the second side wall 215 of the mold frame 211 and the frame margin 213 further define a space 217 where at least one backlight source (not shown) is received. The backlight source may be a CCFL, a hot cathode fluorescent lamp, a light emitting diode (LED), or an electroluminescent lamp (EL). Preferably, the CCFL is used as the backlight source.

Figure 4:
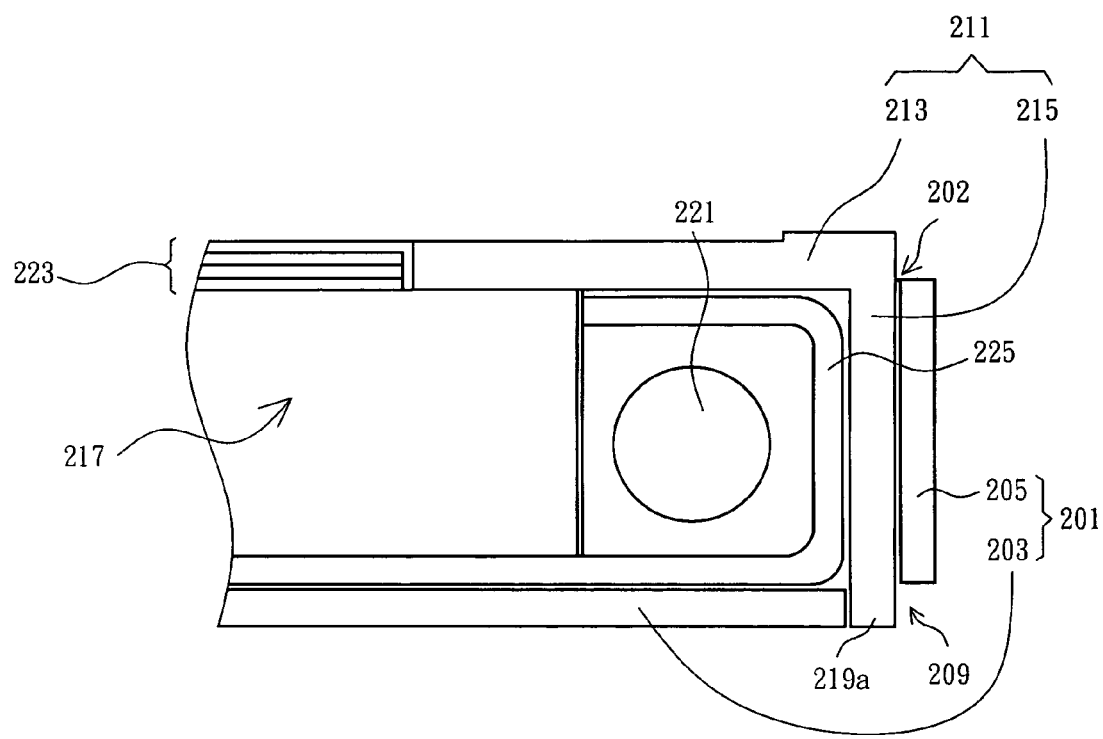
FIG. 4 is a schematic, cross-sectional diagram of part of the backlight module in accordance with a preferred embodiment of the present invention.

Reference is made to FIG. 4, which is a schematic, cross-sectional diagram of part of the backlight module in accordance with a preferred embodiment of the present invention. An end of the protruding portion 219a of the mold frame 211 may have an I-shaped cross-section, and the protruding portion 219a inserts into the corresponding hole 209 on the chassis 201, so as to fasten the mold frame 211 into the space 207 of the chassis 201 as shown in FIG. 3. Nevertheless, the shape and the size of the foregoing mold frame 211 depend on the requirement or the shape and the size of the hole 209, and should not be construed as limited to the embodiments set forth herein. An end of the protruding portion 219 of the mold frame 211 may have I-shaped or an L-shaped hook cross-section.

Figure 5:
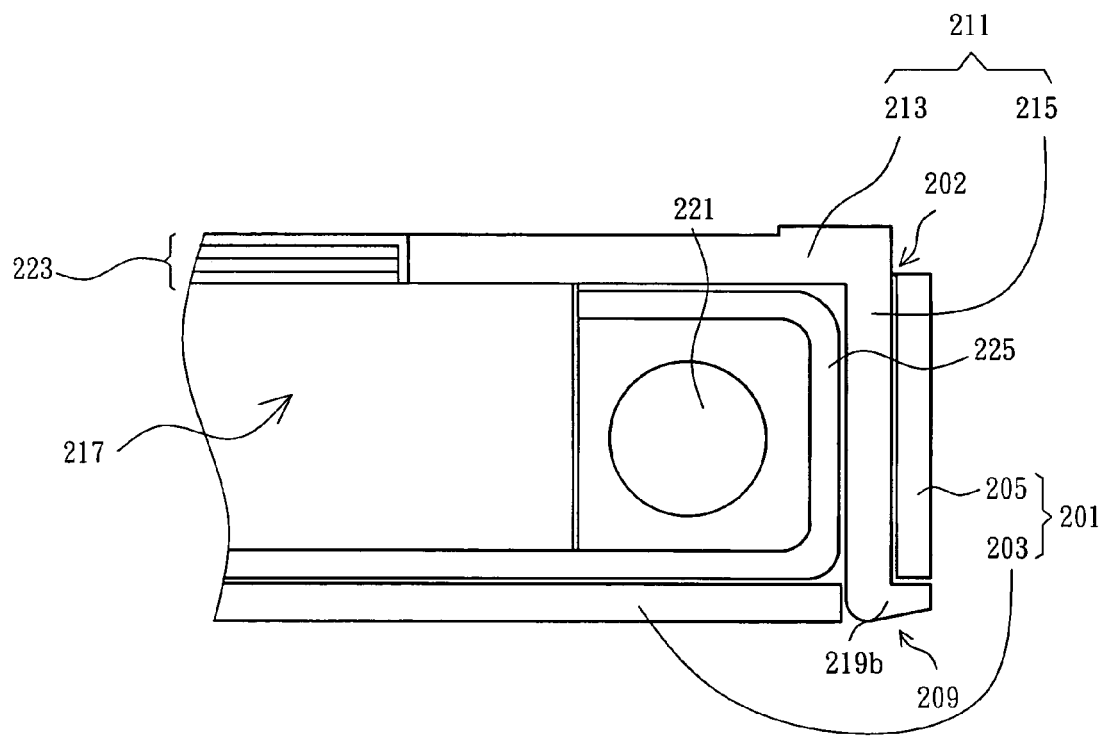
FIG. 5 is a schematic, cross-sectional diagram of part of the backlight module in accordance with another preferred embodiment of the present invention.

Reference is made to FIG. 5, which is a schematic, cross-sectional diagram of part of the backlight module in accordance with another preferred embodiment of the present invention. An end of the protruding portion 219b of the mold frame 211 may have an L-shaped hook cross-section, and the protruding portion 219b inserts into the corresponding hole 209 on the chassis 201, thereby fastening the mold frame 211 into the space 207 of the chassis 201. The protruding portion 219b with the L-shaped hook cross-section not only reinforces the fixing function at a vertical orientation of the mold frame 211 and the chassis 201, but also prevents fastening between the mold frame 211 and the chassis 201 from the drawbacks of assembly displacement due to failing fastening, and more explicitly increases alignment and tightness. However, a person skilled in the art can understand that the present invention can be embodied by other fixing ways, such as securing, clasping, fastening, interlocking and the like, to fix the mold frame 211 to the chassis 201, and thus further details do not need to be described herein.

It is worthy of mention that, in FIGS. 4 and 5, the protruding portions 219a or 219b of the mold frame 211 are engaged into each hole 209 of the chassis 201, and thus the mold frame 211 may not shift or even generate a twisted displacement. Meanwhile, the films 223 such as the diffuser and the light guide plate are flat, and the backlight sources 221 do not shift. Consequently, the present invention reduces drawbacks such as a light leak of the backlight module or luminescent lines occurring on the LCD panel in the prior art. Furthermore, in regard to the driving IC with TCP technique, the uneven edge 202 of the chassis 201 may not easily scrape the driving IC 225 on the side of the backlight sources 221 during the assembling process due to improvements in alignment and tightness between the mold 211 and the chassis 201.

Therefore, according to the aforementioned preferred embodiments, one advantage of the present invention is that fastening stability and positioning accuracy between the mold frame and the chassis are increased, and the problems of light leak caused by the backlight module and scratches on the driving IC on the side of the backlight sources in the prior art are reduced.

As is understood by a person skilled in the art, the foregoing preferred embodiments of the present invention are illustrated of the present invention rather than limiting of the present invention. It is intended that various modifications and similar arrangements be included within the spirit and scope of the appended claims, the scope of which should be accorded the broadest interpretation so as to encompass all such modifications and similar structure.

What is claimed is:

1. An engaging structure of backlight module, comprising:
   a chassis comprising a bottom plate, a first side wall disposed on the bottom plate and surrounding an edge thereof to define a space, and at least one hole located along a common edge of the first side wall and the bottom plate and perforating the first side wall and the bottom plate; and
   a mold frame mounted in the space of the chassis and comprising a frame margin and a second side wall disposed beneath the frame margin and surrounding an outer edge thereof, wherein a bottom edge of the second side wall has at least one protruding portion inserting into corresponding holes on the chassis, whereby the mold frame is fastened into the space of the chassis.

2. The engaging structure of backlight module according to claim 1, wherein an end of the protruding portion has an I-shaped cross-section.

3. The engaging structure of backlight module according to claim 1, wherein an end of the protruding portion has an L-shaped hook cross-section.

4. The engaging structure of backlight module according to claim 1, wherein the mold frame is formed from plastic with a mold.

5. The engaging structure of backlight module according to claim 1, wherein the chassis is made of aluminum.

6. An engaging structure of backlight module, comprising:
- a chassis comprising a bottom plate, a first side wall disposed on the bottom plate and surrounding an edge thereof to define a space, and at least one hole located along a common edge of the first side wall and the bottom plate and perforating the first side wall and the bottom plate; and
- a mold frame mounted in the space of the chassis and comprising a frame margin and a second side wall disposed beneath the frame margin and surrounding an outer edge thereof, wherein a bottom edge of the second side wall has at least one protruding portion, an end of the protruding portion has an I-shaped cross-section and is inserted into corresponding holes on the chassis, whereby the mold frame is fastened into the space of the chassis.

7. The engaging structure of backlight module according to claim 6, wherein the mold frame is formed from plastic with a mold.

8. The engaging structure of backlight module according to claim 6, wherein the chassis is made of aluminum.

9. An engaging structure of backlight module, comprising:
- a chassis comprising a bottom plate, a first side wall disposed on the bottom plate and surrounding an edge thereof to define a space, and at least one hole located along a common edge of the first side wall and the bottom plate and perforating the first side wall and the bottom plate; and
- a mold frame mounted in the space of the chassis and comprising a frame margin and a second side wall disposed beneath the frame margin and surrounding an outer edge thereof, wherein a bottom edge of the second side wall has at least one protruding portion, and an end of the protruding portion has an L-shaped hook portion inserting into corresponding holes on the chassis, whereby the mold frame is fastened into the space of the chassis.

10. The engaging structure of backlight module according to claim 9, wherein the mold frame is formed from plastic with a mold.

11. The engaging structure of backlight module according to claim 9, wherein the chassis is made of aluminum.

* * * * *